United States Patent [19]

Mine

[11] 4,363,773
[45] Dec. 14, 1982

[54] SUPERCONDUCTIVE ELECTROMAGNET APPARATUS

[75] Inventor: Susumu Mine, Zushi, Japan

[73] Assignee: Tokyo Shibaura Denki Kabushiki Kaisha, Kawasaki, Japan

[21] Appl. No.: 92,033

[22] Filed: Nov. 7, 1979

[30] Foreign Application Priority Data

Nov. 13, 1978 [JP] Japan .................. 53-138860

[51] Int. Cl.³ .................. G21B 1/00; H01F 7/06
[52] U.S. Cl. .................. 376/142; 336/DIG. 1; 335/216
[58] Field of Search .................. 176/3, 9; 335/216; 336/DIG. 1; 376/142

[56] References Cited

U.S. PATENT DOCUMENTS

| | | |
|---|---|---|
| 3,363,207 | 1/1968 | Brechna . |
| 3,394,330 | 7/1968 | Schindler . |
| 3,408,619 | 10/1968 | Schrader . |
| 3,559,130 | 1/1971 | Schrader . |
| 3,748,615 | 7/1973 | Bogner et al. .............. 336/DIG. 1 |
| 3,761,852 | 9/1973 | Albrecht .............. 336/DIG. 1 |
| 3,801,942 | 4/1974 | Elsel .............. 335/216 |
| 4,066,496 | 1/1978 | Brown .............. 176/3 |
| 4,174,254 | 11/1979 | Gaines .............. 176/3 |

FOREIGN PATENT DOCUMENTS 52-72091  6/1977  Japan .............. 176/3

OTHER PUBLICATIONS

Proc. 7th Symp. Eng. Pbs. of Fusion Res., (10/25-28/77), pp. 746-750, Turner et al.
Proc. 6th Symp. Eng. Pbs. of Fus. Res., (11/18-21/75), pp. 738-750, Bonanos et al., IEEE Pub. No. 75 CH1097-5-NPS.
Proc. 9th Symp. Fus. Tech., (6/76), pp. 197-203, Hartz et al.
Proc. 7th Symp. Eng. Pbs. Fus. Res., vol. 2, pp. 926-930 (10/77), Quay et al.
5th Conf. on Mag. Tech. (MT-5), pp. 305-311 (4/21-25/75), Young et al.
Karasik V. R., "Physics and Technics of Strong Magnetic Fields", Nauka Publishing House, Moscow, 1964, pp. 64, 70 & 71.
V. B. Zenkiewicz, V. V. Sychev, "Magnetic Superconductive Systems", Nauka Publishers, Moscow, 1972 p. 234.

*Primary Examiner*—Sal Cangialosi
*Attorney, Agent, or Firm*—Oblon, Fisher, Spivak, McClelland & Maier

[57] ABSTRACT

Disclosed is a superconductive electromagnet apparatus having a coil with a coiled conductor with a channel between adjacently disposed the paths of the coil conductor of which width is selected in accordance with amounts of heat produced at the corresponding portions of the coil section as viewed in cross section.

10 Claims, 5 Drawing Figures

SUPERCONDUCTIVE ELECTROMAGNET APPARATUS

This invention relates to a superconductive electromagnet apparatus.

A conventional superconductive electromagnet apparatus is assembled into such a nuclear reactor as shown in FIG. 1. Reference numeral 12 designates a doughnut-shaped vacuum container having plasma 14 existing therein. A plurality of superconductive electromagnets $16_1$, $16_2$, $16_3$, ... $16_n$ are disposed orthogonally to the extending direction of the vacuum container 12 on its outer peripheral wall in order to maintain the plasma 14 stably, that is to say, to maintain the continuity and a central position, as viewed cross-sectionally, of the plasma 14 along the entire peripheral path of the container 12. Superconductive electromagnets $18_1$, $18_2$, $18_3$, ... $18_m$ are further disposed around the outer peripheral wall of the container 12, extending along the container 12 in order to maintain super high-temperature for a long time and to cause thermonuclear reaction.

The magnets 16 are 18 are much the same in structure, as shown in FIG. 2, for example. Reference numeral 22 in FIG. 2 denotes a poloidal coil having a coil conductor 24 of which cross-sectional size is substantially the same along the entire coil conductor. A frame 26 supports the coil 22. A coil assembly comprising the coil 22 and the frame 26 is housed in a container 30 having, for example, liquid helium flowing therein. The container 30 having the coil assembly is further housed in a vacuum container 32.

A conventional superconductive electromagnet apparatus having the poloidal coil assembled thereinto as shown in FIG. 2 has substantially the same cross-sectional size of the coiled conductor 24 along the entire length thereof. A space between the adjacent paths of the coil conductor 24 spirally arranged in a multilayered fashion functioned as a channel 34 or a coolant flow path having a width which is uniform along the entire length thereof.

A magnetic field of the conductor disposed at the inner side of the multilayered coil section as viewed in the cross section is higher than the one at the outer side. Therefore, when the coil conductor 24 having an equal cross-sectional size along the entire length changes the conductivity from a superconductive state to a normal conductive state, the resistance of the inner side coil conductor is higher than that of the outer side coil conductor because of the magnetoresistance effect, so that the inner side conductor has a large amount of heat, compared with the outer side conductor. Heat generated is carried away through holes 28 by a coolant such as liquid helium (He) flowing in the channel 34 provided between the adjacent paths of the conductor 24 spirally arranged in the multilayered fashion. Since the width of the channel 34 is kept to be much the same, a cooling ability or a heat absorbing ability of the coolant flowing in the channel at the respective portions along the multilayered coil section as viewed in cross section is the same over the entire length thereof. The heat release rate at the inner portion having high heat value of the coil section is lower than the one of the outer portion. Therefore, the temperature in the inner portion of the coil section rises especially high. For this, the coil does not operate stably.

In order to solve this problem, a superconductive electromagnet apparatus having a structure as shown in FIG. 3 is developed. For simplicity of the illustration, like reference numerals are used to designate the like portions in FIG. 3 and only the different portions thereof will be made.

As shown in FIG. 3, the coil conductor is illustrated with five portions $44_1$ to $44_5$ in cross section for ease of explanation; however it is actually a single continuous conductor spirally wound in a multilayered fashion. This is true for the channel 34. The cross-sectional size of the inner-side coil placed in a higher magnetic field is larger than the one of the outer-side coil in a lower magnetic field. Specifically, the cross-sectional size of the inner-side conductor $44_1$, for instance, is larger than the size of the outer-side conductor $44_5$ of the coil 42. This structure lowers an average current density of the coil conductor $44_1$, in a high magnetic field with respect to the one of the coil conductor $44_5$ in a low magnetic field. Hence, this makes the heat distribution uniform over the entire coil 42 in a normal conductive state, thus avoiding a temperature rise in a specific portion of the coil section and stabilizing the operation of the coil 42.

However, in manufacturing the electromagnet apparatus shown in FIG. 3, either connection of conductors having different cross-sectional sizes or laying of additional conductor layers around the basic conductor is necessary for the conductor portion with a large cross section. For this, the manufacturing process of the apparatus is complicated. Where the coil 42 is formed by conductors of different cross-sectional sizes connected with each other, heat will be generated when current is supplied to the coil 42 at the connection portion, resulting in an excessive evaporation of coolant.

Accordingly, an object of the invention is to provide a superconductive electromagnet apparatus in which there is no temperature rise at a specific portion of the coil section, the coil therefore operates stably and the manufacturing of the apparatus is easy.

According to the invention, there is provided a superconductive electromagnet apparatus with a coil having a coil conductor of which the cross sectional size is substantially the same over its entire length. A channel is disposed between the adjacently arranged paths of the coil conductors, the width of which changes in accordance with amounts of heat produced at the respective portions of the coil section.

The invention will be more clearly understood from the following description taken in connection with the accompanying drawings, in which.

Figure 1:
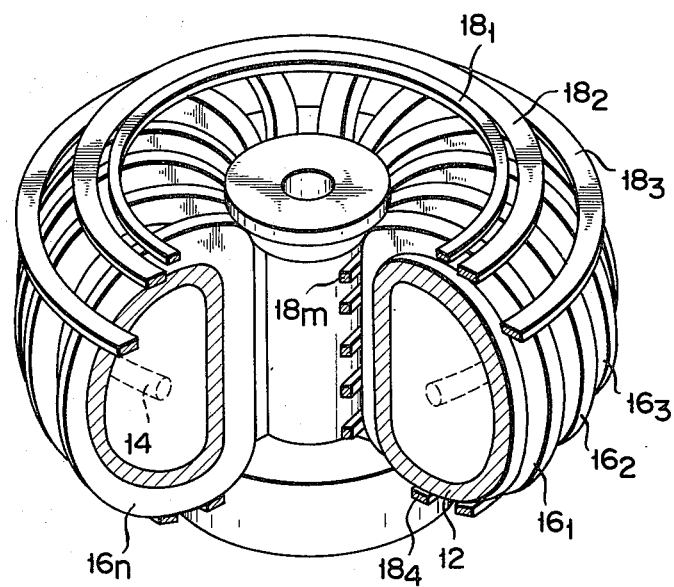
FIG. 1 shows a general view of the construction of a nuclear reactor to which the invention is applied.
Figure 2:
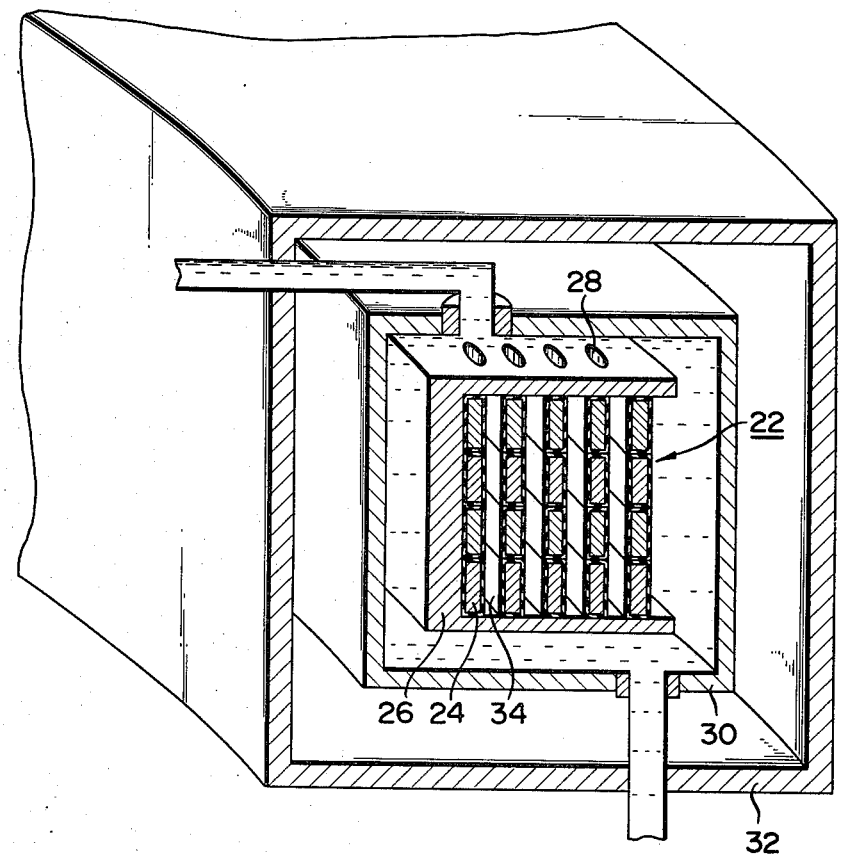
FIG. 2 shows a cross sectional view of the construction of a superconductive electromagnet apparatus of prior art which is assembled into the nuclear reactor shown in FIG. 1.
Figure 3:
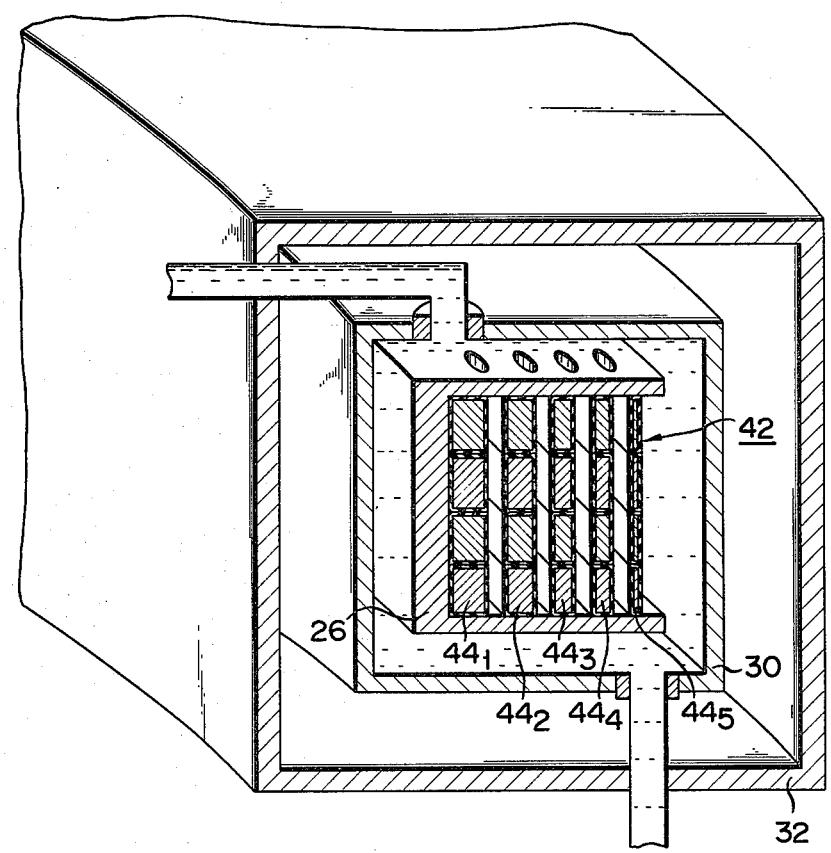
FIG. 3 shows a cross sectional view of the construction of another superconductive electromagnet apparatus of prior art.
Figure 4:
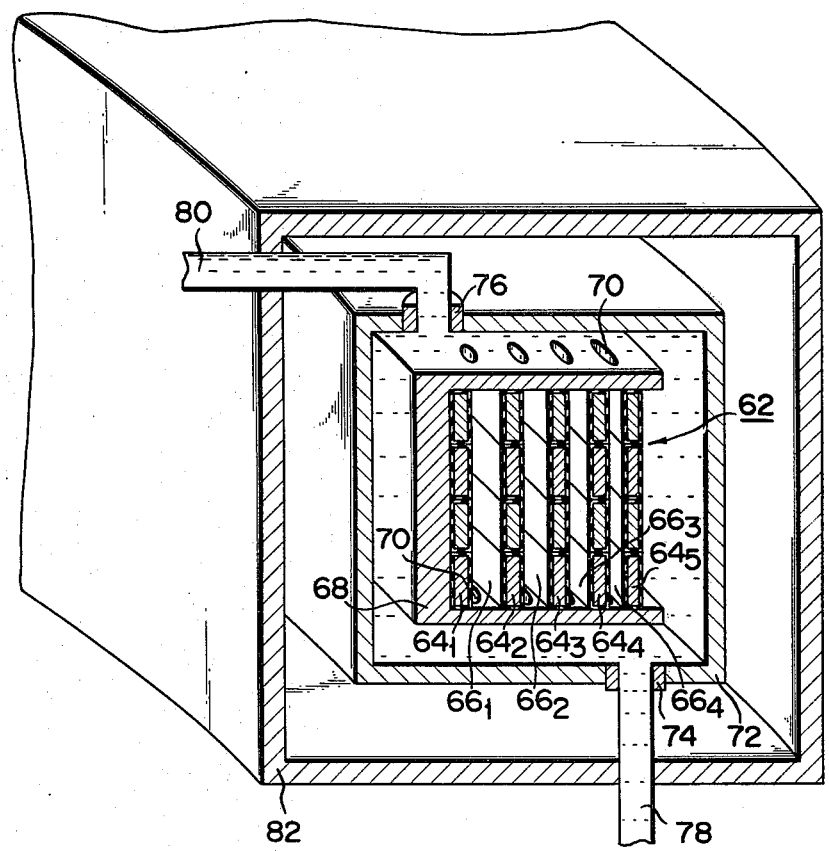
FIG. 4 shows a cross sectional view of the construction of superconductive electromagnet apparatus which is an embodiment according to the invention.

Reference is made to FIG. 4 schematically illustrating a structure of a superconductive electromagnet apparatus according to the invention. In the figure, reference numeral 62 designates a poloidal coil comprising a coil conductor generally designated as 64, specifically $64_1$ to $64_5$. Although the coil conductor is illustrated with five portions $64_1$ to $64_5$ in cross section, it is actually a single continuous conductor spirally wound around a frame 68 in a multilayered fashion. The same thing is true for a channel 66 providing a coolant flow path which separates the adjacent paths of the coil conductor 64 spirally arranged in the multilayered fashion. That is, the channel 66 is illustrated as four portions denoted as $66_1$ to $66_4$. The periphery of the wound coil conductor is covered with insulating material such as epoxy resin. The frame 68 with the coil conductor 64 wound therearound is U shaped and made of stainless steel, for example. The frame 68 is provided with a plurality of holes 70 for permitting escape of air bubbles occuring when the current flows through the conductor 64. The poloidal coil 62 supported by the frame 68 is housed in a container 72 made of stainless steel, for example, in which a coolant such as a liquid helium flows. The container 72 is provided with an opening 74 for coolant inflow and another opening 76 for coolant outflow. Those openings 74 and 76 are coupled with an inflow tube 78 and an outflow tube 80, respectively. The container 72 is disposed within a vacuum container 82 made of stainless, for example, vacuumized.

In operation, current is fed into the conductor 64 for performing the function of the electromagnet apparatus. When the conductor 64 is in a superconductive condition, the resistance of the conductor 64 is substantially zero, so that no heat is produced in the conductor although the current flows therethrough, and the coil operates stably.

When the conductivity of the conductor 64 is changed to a normal conductive state, the conductor 64 has a certain value of resistance. The resistance of the conductor 64 is so varied that the conductor 64 disposed at the inner side of the coil section as viewed in the cross section has the largest resistance and its value becomes smaller as the conductor disposed goes outside. Therefore, the heat amount generated in the inner side conductor $64_1$, for example, is larger than that of the outer side conductor $64_5$, for example.

In order to operate the coil 62 stably, the temperature rise of the entire coil and a specific part of the coil 62 as well must be prevented. To this end, a large amount of heat at the inner side of the multi-layered coil section as well as a small amount of heat at the outer side of the coil section must be radiated to exterior as possible. The embodiment above described satisfies the requirement on the basis of an idea that a larger amount of coolant is supplied to the inner side channel where a larger amount of heat is evolved from the coil conductor. The idea is realized in a manner that the channel width of the channel 66 is gradually shorter as it goes to the outside of the coil section.

To be more specific, a coolant such as a liquid helium flows through the channel 66 formed the adjacently disposed coil conductor 64 in order to carry out heat generated at the normal conductive state of the conductor and to prevent the temperature rise thereat. In the normal conductive condition, the inner coil conductor produces a larger amount of heat than the outer side conductor. As described above, the width of the channel at the inner side is wider than that of the outer side of the channel. Therefore, an amount of the coolant flow in the inner side channel is larger than that of the outer side of the channel. In other words, the heat absorption ability of the inner side channel is higher than that of the outer side channel by an amount of the increase of the coolant. Therefore, a large amount of heat generated in the inner side conductor is effectively carried out to exterior by the coolant, and therefore the temperature rise of the specific area, i.e. the inner side of the coil section, is prevented, with improvement of the stability of the operation of the coil 62. The specific size of the channel at the respective portions of the coil section must be selected corresponding to the amount of heat generated at the corresponding coil conductor portion.

As described above, the width of the channel for coolant passage is selected in accordance with the heat amount at the corresponding portion of the coil section. Specifically, the channel width is wide at the portion where a large amount of heat is produced, so that a large amount of heat generated is effectively carried away to exterior. As a result, the rise of temperature in a specific portion of the coil section is prevented and a stable operation of the coil is ensured.

In the above-described embodiment, the coolant is circulating through the channel. Instead, the coolant may not be circulated, yet achieving a satisfactory heat absorption.

In addition to the above-mentioned embodiment where the invention is applied for the superconductive electromagnet apparatus, this invention is also applicable for any other suitable superconductive electromagnet apparatus having a coil of other types than poloidal type, associated with the coolant passage channel.

In other words, the concept that the width of the coolant passage channel is selected in accordance with an amount of the heat produced at the respective portions thereby to prevent a temperature rise at a specific portion of the coil section, is applicable for other superconductive electromagnet apparata with other types of coils.

The present invention is very useful especially for the superconductive electromagnet apparatus with a magnet used for a toroidal or poloidal magnet for the nuclear fusion or other large sized magnets, for example, a magnet for hydrogen bubble chamber, a magnet for energy storage, and the magnet for magnetohydrodynamics device.

Figure 5:
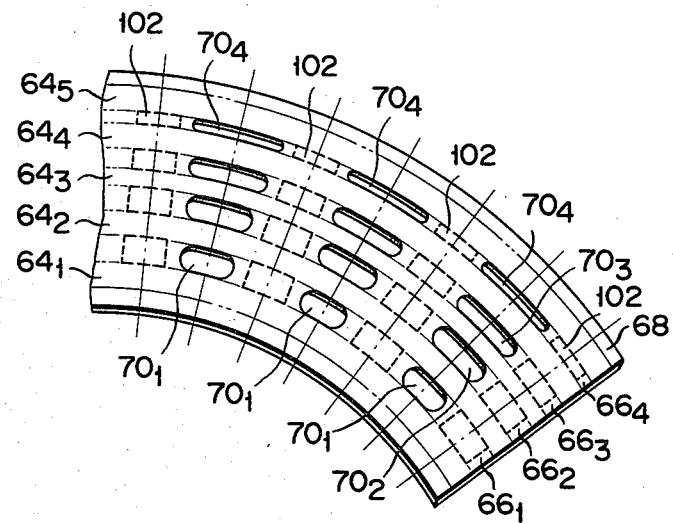
FIG. 5 diagrammatically illustrates an arrangement of spacer members used in the superconductive electromagnet apparatus according to the invention.

As shown in FIG. 5, spacers 102 are inserted in the channels defined between the adjacent paths of the coil conductor in order to keep the width of each channel at a given dimension. The width of the spacer 102, in the radial direction of the poloidal coil 62, is substantially equal to that of the corresponding channel 66. The spacers 102 have substantially the same width in the circumferential direction of the poloidal coil 62. In order to ensure the constancy of the channel width, it is desirable that those spacers 102 are arranged in a serial fashion in the radial direction of the poloidal coil.

As shown in FIG. 4, holes 70 for escape of helium gas bubbles produced when the conductor 64 of coil 62 is in the normal conductive state and the current flows therein to causes heat are formed in the frame 68 at the position where the holes 70 communicated with the corresponding channels, respectively. In order to effectively escape air bubbles, the width of the holes is preferably selected corresponding to the width of the channel communicating therewith. Specifically, as shown in FIG. 5, a hole $70_1$ communicating with an inner channel $66_1$ has the radial direction width larger than that of a hole $70_4$ communicating with an outer channel $66_4$.

Each of the holes $70_1$, $70_2$, $70_3$ and $70_4$ is longer than the immediatly inner holes in the circumferential direction. To effectively escape air bubbles, the holes 70 ($70_1$, $70_2$, $70_3$ and $70_4$) are preferably arranged in serial fashion in the radial direction of the coil section. In the figure, a block indicated by dotted line indicates a spacer 102 disposed within the channel 66.

I claim:

1. A superconductive electromagnet apparatus comprising:
   a coil made of a conductor which is coiled around an axis to define a spiral channel having a width which is progressively narrower from an inner portion of said coil to an outer portion of said coil farther away from said axis than said inner coil portion and which has substantially the same cross section over the entire length; and
   frame means for supporting said coil and having a plurality of holes communicating with said channel for allowing air bubbles to escape.

2. A superconductive electromagnet according to claim 1, further comprising: said holes of said frame means each having a width corresponding to that of the corresponding portion of said channel.

3. A superconductive electromagnet according to claim 1, further comprising spacer members disposed in said channel so that said channel has different widths at different portions.

4. A superconductive electromagnet apparatus according to claim 1, in which said coil is a poloidal and/or toroidal coil.

5. A superconductive electromagnet apparatus according to claim 4, further comprising:
   said holes of said frame means each having a cross-sectional size corresponding to that of the corresponding portion of said channel.

6. A superconductive electromagnet apparatus according to claim 1, further comprising spacer members disposed in said channel so that said channel has its width progressively narrowed from the inner portion of said coil toward the outer portion of said coil.

7. A superconductive electromagnet apparatus according to claim 5, in which said holes are arranged in a serial fashion in the radial direction of said poloidal and/or toroidal coil.

8. A superconductive electromagnet apparatus according to claim 6, in which said spacer members are disposed in a serial fashion in the radial direction of said poloidal and/or toroidal coil.

9. A superconductive electromagnet apparatus according to claim 7, in which said holes are progressively shorter in the circumferential direction of said coil, toward the center of said coil.

10. A superconductive electromagnet apparatus according to claim 8, in which said spacer members have the same width in the circumferential direction of said coil.

* * * * *